United States Patent
Karpenko

(10) Patent No.: US 9,691,126 B2
(45) Date of Patent: *Jun. 27, 2017

(54) SYSTEMS AND METHODS FOR RECIPIENT-SIDE IMAGE PROCESSING

(71) Applicant: Facebook, Inc., Menlo Park, CA (US)

(72) Inventor: Alexandre Karpenko, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,585

(22) Filed: Aug. 23, 2016

(65) Prior Publication Data

US 2016/0358308 A1 Dec. 8, 2016

Related U.S. Application Data

(63) Continuation of application No. 14/465,441, filed on Aug. 21, 2014, now Pat. No. 9,489,711.

(51) Int. Cl.
*G06K 9/40* (2006.01)
*G06T 3/00* (2006.01)
*G06F 3/14* (2006.01)
*G09G 5/00* (2006.01)
*G09G 5/02* (2006.01)
(Continued)

(52) U.S. Cl.
CPC .......... *G06T 3/0056* (2013.01); *G06F 3/1454* (2013.01); *G06T 5/003* (2013.01); *G06T 11/001* (2013.01); *G09G 5/005* (2013.01); *G09G 5/02* (2013.01); *G09G 2340/02* (2013.01); *G09G 2340/0407* (2013.01); *G09G 2340/06* (2013.01);
(Continued)

(58) Field of Classification Search
CPC .......................... G06F 3/1415; G06T 3/0056
See application file for complete search history.

(56) References Cited

U.S. PATENT DOCUMENTS

2005/0005109 A1* 1/2005 Castaldi ............... G06F 21/606
713/165
2007/0112944 A1* 5/2007 Zapata ..................... G06F 8/65
709/221
(Continued)

FOREIGN PATENT DOCUMENTS

EP 1480196 11/2004
EP 1775946 4/2007
(Continued)

OTHER PUBLICATIONS

International Application No. PCT/US2015/045581, International Search Report and Written Opinion mailed Oct. 28, 2015.
(Continued)

*Primary Examiner* — Phuoc Tran
(74) *Attorney, Agent, or Firm* — Sheppard Mullin Richter & Hampton LLP

(57) ABSTRACT

Systems, methods, and non-transitory computer readable media configured to create, process, and/or modify images are provided. Recipient image data associated with an original image captured by a second computing system can be received by a first computing system. A first intermediate image may be generated based on the recipient image data. A first viewable image for display on the first computing system may be generated based on the first intermediate image.

20 Claims, 13 Drawing Sheets

(51) Int. Cl.
*G06T 5/00* (2006.01)
*G06T 11/00* (2006.01)

(52) U.S. Cl.
CPC ... *G09G 2370/022* (2013.01); *G09G 2370/10* (2013.01); *G09G 2370/22* (2013.01)

(56) References Cited

U.S. PATENT DOCUMENTS

| | | |
|---|---|---|
| 2008/0008392 A1 | 1/2008 | Goel et al. |
| 2009/0296906 A1 | 12/2009 | Kuroda et al. |
| 2011/0269424 A1* | 11/2011 | Multer ............... H04L 67/1095 455/411 |
| 2011/0311199 A1 | 12/2011 | Fay et al. |
| 2012/0271948 A1 | 10/2012 | Martin |
| 2013/0011121 A1 | 1/2013 | Forsyth et al. |
| 2014/0371894 A1 | 12/2014 | Shan et al. |
| 2015/0089348 A1* | 3/2015 | Jose ................. G06F 17/30905 715/234 |

FOREIGN PATENT DOCUMENTS

| | | |
|---|---|---|
| JP | 2009-094797 | 4/2009 |
| KR | 10-2006-0030278 | 4/2006 |
| WO | 2013117140 | 8/2013 |

OTHER PUBLICATIONS

European Patent Application No. 15181795.4, Search Report mailed Jan. 25, 2016.

* cited by examiner

SYSTEMS AND METHODS FOR RECIPIENT-SIDE IMAGE PROCESSING

CROSS-REFERENCE TO RELATED APPLICATIONS

This application is a continuation of U.S. patent application Ser. No. 14/465,441, filed on Aug. 21, 2014 and entitled "SYSTEMS AND METHODS FOR RECIPIENT-SIDE IMAGE PROCESSING", which is incorporated herein by reference.

FIELD OF THE INVENTION

The present technology relates to the field of image processing. More particularly, the present technology provides techniques for processing media on the recipient-side in a social network.

BACKGROUND

Today, people have many options available for taking pictures. In addition to traditional cameras dedicated exclusively to capturing images in film or digital form, many mobile devices, such as smartphones, have the capability to take pictures. For example, a mobile device may include a camera and an application that allows the user to take pictures with the camera on the mobile device. These images may be stored and available for viewing at any time. In view of the increasingly popular capabilities of social networks, photos may be shared with the user's connections in many different ways.

Images can be processed in various ways and at various times. In general, image processing may involve an image as an input, such as a photograph or video frame, and an image or a set of characteristics or parameters associated with the image as an output. Images may be processed after they are captured and before they are rendered for viewing. For example, an image may be altered or annotated after it is captured and before it is shared with the user's connections. A user may choose to enhance some image effects to improve aesthetics of an image. The exposure, color, hues, and other parameters of an image may be edited before it is shared and viewed by a user's connections.

SUMMARY

Various embodiments of the present disclosure can include systems, methods, and non-transitory computer readable media configured to create, process, and/or modify images. In some embodiments, recipient image data associated with an original image captured by a second computing system can be received by a first computing system. A first intermediate image may be generated based on the recipient image data. A first viewable image for display on the first computing system may be generated based on the first intermediate image.

In one embodiment, the first viewable image may be displayed by the first computing system.

In one embodiment, the recipient image data may be decoded based on a format when generating the first intermediate image.

In one embodiment, information related to the first computing system may be provided by the first computing system to the second computing system. The format may be determined by the second computing system.

In one embodiment, the first computing system is a client device.

In one embodiment, the format is determined based on at least one of the information related to the first computing system and information related to the second computing system.

In one embodiment, the second computing system is a client device.

In one embodiment, the format is determined based on the information related to the first computing system and information related to a third computing system. The information related to the third computing system received by the second computing system.

In one embodiment, the second computing system is a server.

In one embodiment, the third computing system is a client device.

In one embodiment, the recipient image data is decrypted to generate decrypted image data. The decrypted image data is decoded, based on a format, to create the first intermediate image.

In one embodiment, an image filter is applied to the intermediate image when generating the first viewable image based on the first intermediate image.

In one embodiment, a set of intermediate images including the first intermediate image is generated based on the recipient image data. The first viewable image generated based on the first intermediate image is based on the set of intermediate images.

In one embodiment, the set of intermediate images is stored in the first computing system. The first viewable image is stored in the first computing system.

In one embodiment, a second viewable image for display on the first computing system is received by the first computing system. The second viewable image is generated from a second intermediate image by a second computing system.

In one embodiment, blur associated with the viewable image is less than blur associated with the original image.

In one embodiment, the intermediate image has a first resolution and the viewable image has a second resolution.

In one embodiment, the intermediate image has a first color format and the viewable image has a second color format.

Many other features and embodiments of the invention will be apparent from the following detailed description and from the accompanying drawings.

Figure 1:
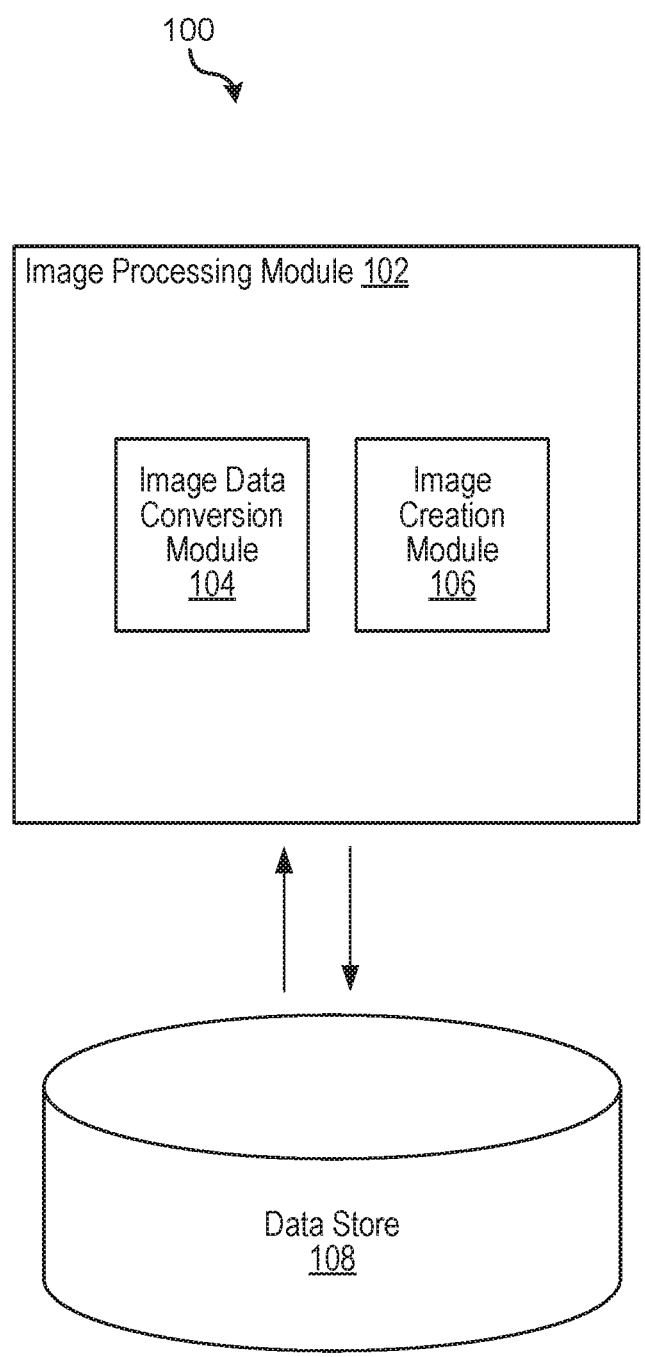
FIG. 1 illustrates an example system including an example image processing module configured to render and/or process images, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social networking systems may include a client application that enables a user to interface with the social networking system. The term "client application" is used broadly herein and may include any program or software that provides a user interface to be presented or displayed on a client device for a user. The client application may include a standalone application executed from the client device, such as a mobile application executed from a mobile phone. The client application may also include a website having one or more web pages accessible by the user through a web browser on the client device. The client application may provide images for display to a user on a client device. The images described herein may relate to pictures, photographs, graphical images, advertisements, etc. In certain instances, the images described herein may also be equally applicable to a set of images, such as video. It should be appreciated that while features of the systems and methods in the present disclosure may be described with respect to a social networking system, the features may also be applicable to any other suitable networked computer systems involving display of various images.

In certain circumstances, to share an image, a user needs to select one or more recipients, with whom the image or the video is to be shared. The image that is shared is often processed on the sender side. That is, subsequent to the image being captured and/or selected by the sender, the image is processed by the client device that is used by the sender. For example, the image may be edited or altered by the sender prior to being shared with the recipients designated by the sender. As another example, the image may be stabilized by the client device used by the sender prior to being shared with the recipients designated by the sender. The image to be shared needs to be processed prior to being sent to a server or the client device used by a recipient. Consequently, a delay in transmission of the processed image to the recipient is inevitable due to the time required for processing.

FIG. 1 illustrates an example system 100 including an example image processing module configured to create, process, and/or modify images, according to an embodiment of the present disclosure. As shown in FIG. 1, the example image processing module 102 may comprise an image data conversion module 104 and an image creation module 106.

The example system 100 may include at least one data store 108. In the example of FIG. 1, the at least one image store 110 may be configured to store image data and images including an original image, an intermediate image, and a viewable image. An image may be generated from image data. In some embodiments, image data may be a data stream that is a sequence of digitally encoded coherent signals or data packets carrying information of an image. Image data may be generated by compressing an image according to a variety of compression related formats. Various compression techniques may be used in different embodiments, such as lossless compression (e.g., FFV1, JPEG 2000 lossless, PNG, QuickTime, etc.) or lossy compression (e.g., Cinepak, H.261, MPEG-4 Part 2, etc.).

In various embodiments, original images that are captured by a sender as well as derivative images that are processed based on the original images may be stored in the data store 108. At least one image parameter of a derivative image is different from the original image. For example, a derivative image may have an image quality, a resolution, or a color format that is different from that of the original image. A derivative image may be the original image with comments, annotations, or special effects. A derivative image may be an intermediate image and/or a viewable image.

The image data conversion module 104 may be configured to generate an image from image data. In various embodiments, the image generated by the image data conversion module 104 is an intermediate image. That is, the image generated by the image data conversion module 104 is not displayed to a recipient in some instances. For example, a recipient's client device may generate an intermediate image based on the image data. In some instances, an intermediate image may not be viewable. Accordingly, the intermediate image may be processed according to the sender's instructions to generate a viewable image that may be presented to a recipient. For example, a sender may select a recipient prior to recording a video clip. Image data of the video clip may be transmitted and received by the recipient while the video clip is being recorded. Intermediate images generated based on image data may be further processed for viewing by the recipient.

The image creation module 106 may be configured to process an intermediate image into a viewable image for presentation to the recipient. The intermediate image may be processed according to a sender's instructions. In some embodiments, the intermediate image may be processed according to complementary or alternative instructions of an intermediary (e.g., server) or recipient (e.g., client device). The viewable image for display to the recipient is generated based on the intermediate image such that the original image is generated according to instructions as provided, for example, by the sender.

Processing the intermediate image to generate the viewable image can involve any type of image processing. For example, a sender may require one or more image parameters (e.g., color, exposure, focus, contrast, blurriness, resolution, etc.) of the original image to be modified when shared with a recipient. As another example, a sender may select application of an image or photographic filter (e.g., Amaro, Mayfair, Sierra, Lo-fi, Inkwell, 1977, etc.) to the original image. As yet another example, the intermediate image may be processed such that stabilization is performed on the original image to generate the viewable image. As yet still another example, the original video clip, as recorded, may be blurry due to various reasons and processing may be performed to improve or correct the blurriness.

Figure 2:
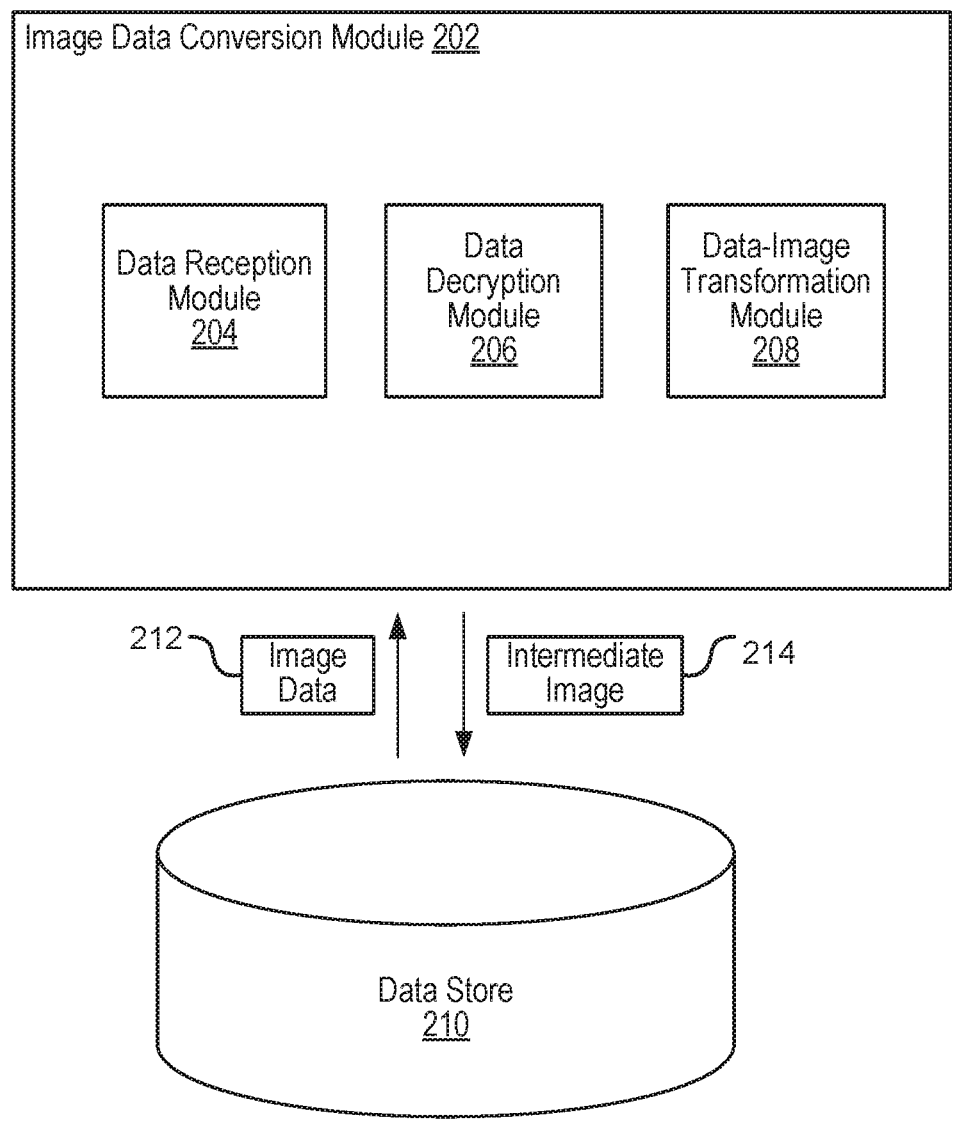
FIG. 2 illustrates an example image data conversion module, according to an embodiment of the present disclosure.

FIG. 2 illustrates an example image data conversion module 202, as shown in FIG. 1 (e.g., the image data conversion module 104), according to an embodiment of the present disclosure. The example image data conversion module 202 may generate a set of intermediate images based on image data. Image data 212 may be obtained or received from at least one data store 210 (e.g., the data store 108 in FIG. 1). An intermediate image 214 may be created based on the image data 212 and may be stored in the data store 210. In various embodiments, an image data conversion module 202 may be configured to generate a set of intermediate images based on image data associated with a video in real time or near real time as the image data is received.

The image data conversion module 202 may include a data reception module 204, a data decryption module 206, and a data-image transformation module 208. Image data may include information of the original image captured by a sender. The original image may be generated from the image data. In some embodiments, images at a lower quality or higher quality but based on the original image may be generated from the image data. Image quality may be informed by various factors including but not limited to sharpness, noise, dynamic range, tone reproduction, contrast, color accuracy, distortion, vignetting, exposure accuracy, lateral chromatic aberration, lens flare, color moire, and artifacts.

The data reception module 204 may be configured to receive image data when a user is designated by a sender as a recipient. In various embodiments, image data is received in real time or near real time as the original image is being captured. Image data may be generated from the original image according to a format that is compatible with or optimized for the recipient device. In some embodiments, received image data may be compressed or otherwise modified in relation to image data of an original image.

The data decryption module 206 may be configured to decrypt the image data received. The image data may be encrypted by an encryption key. The image data may be decrypted by using the encryption key, which may be provided by the sender or obtained from a server.

The data-image transformation module 208 is configured to generate a set of intermediate images based on the image data received by the data reception module 204. In some embodiments, when the received image data is encrypted, the data-image transformation module 208 may be performed on the decrypted image data. As described herein, unless otherwise specified, the image data received is not encrypted. In various embodiments, the data-image transformation module 208 may be configured to decompress the image data and to generate a set of images. The set of images are intermediate images, which may be further processed for display to the recipient.

An intermediate image may comprise information describing pixels, such as the location and the RGB value of a pixel. Accordingly, an intermediate image may provide a basis to create a viewable image for display to the recipient. The viewable image is based on the original image captured by the sender and modified according to the sender's instructions. In some embodiments, the intermediate image may be processed according to complementary or alternative instructions of an intermediary (e.g., server) or recipient (e.g., client device). In some embodiments, an intermediate image may be the image that is presented to the recipient. The data-image transformation module 208 may decompress image data according to various image or video decompression formats. That is, a data stream of the image data may be decoded according to a bitstream format defined by an image or video decompression format.

Figure 3A:
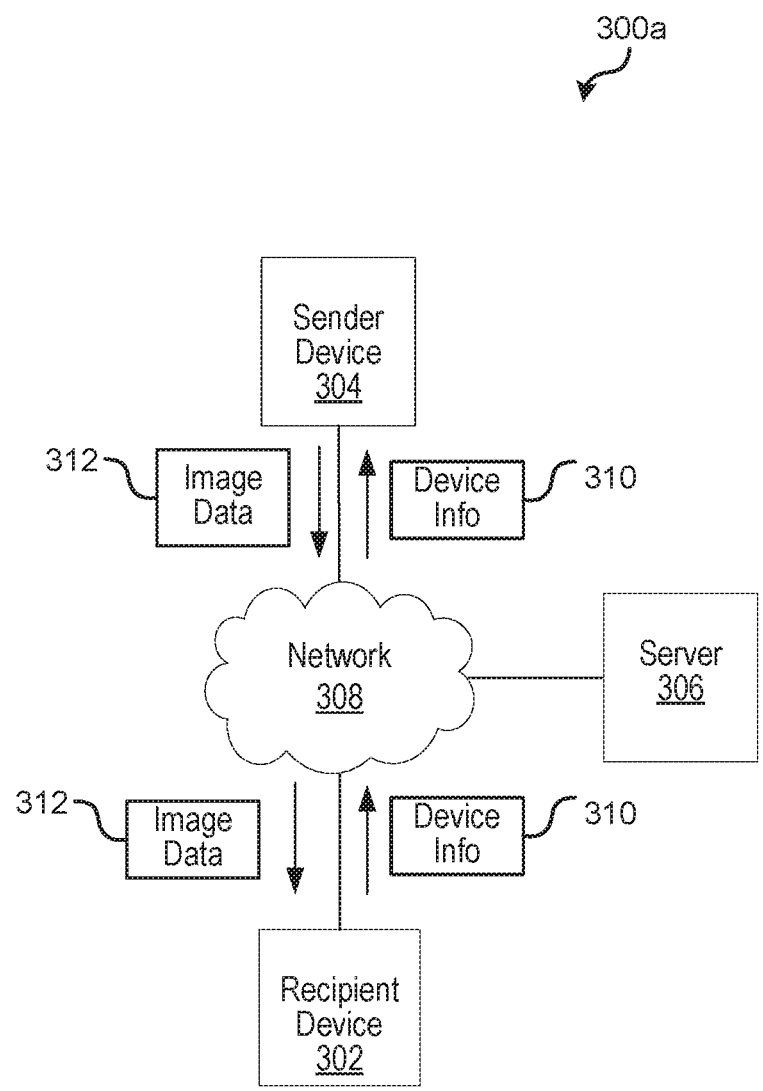
FIG. 3A illustrates an example system for recipient-side image processing, according to an embodiment of the present disclosure.
Figure 3B:
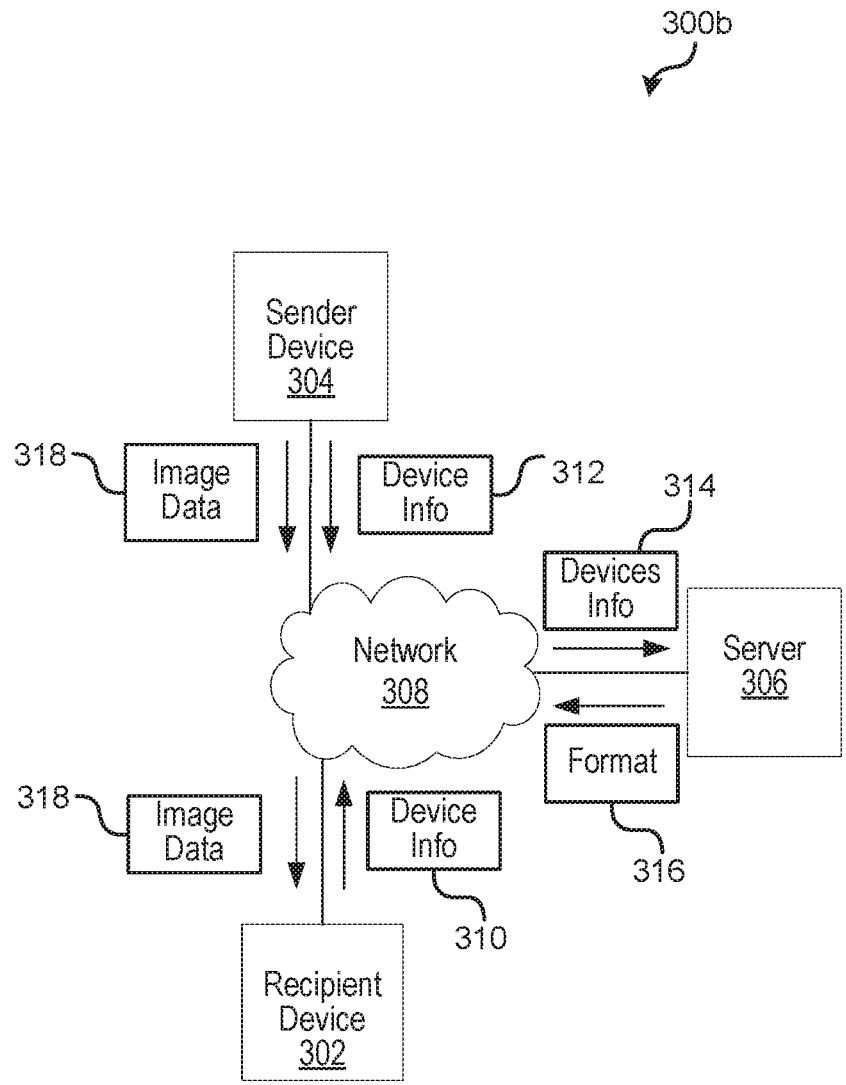
FIG. 3B illustrates an example system for recipient-side image processing, according to an embodiment of the present disclosure.

FIGS. 3A-3B illustrate example systems for recipient-side image processing, according to an embodiment of the present disclosure. FIG. 3A illustrates an example system 300a for recipient-side image processing as shown in FIG. 1 (e.g., the image data conversion module 104), according to an embodiment of the present disclosure.

The illustrated system 300a includes a recipient device 302, a sender device 304, a server 306, and network 308. The recipient device 302 and the sender device 304 may be collectively referred to as client devices. The term "server" is used broadly herein and may include a computer system, such as one or more servers, that provides content to a client device. A client device (e.g., a recipient device 302 or a sender device 304) may include any computer system. In various embodiments, a client device may include a desktop computer, a laptop computer, a tablet computing device, a mobile phone, or any other device. A client device may include a client application and a display. The server 306 may be remote from the recipient device 302 and the sender device 304. The server 306 may be communicatively coupled to a client device (e.g., the recipient device 302 or the sender device 304) via a network 308, such as the Internet. Each of recipient device 302, the sender device 304, and the server 306 may be coupled to the network 308 via a wired or wireless connection.

A client application may be run on the client device (e.g., the recipient device 302 or the sender device 304) and displayed to a user on the display of the client device. The client application may be a standalone application, such as a mobile application for instance. In other embodiments, the client application may be run on the server 306 and communicated to a client device for presentation on the client device. For example, the client application may include a website having one or more web pages accessible by the user through a web browser.

In some embodiments, a data store (e.g., the data store 108 of FIG. 1 or the data store 210 of FIG. 2) may store the original image, image data, as well as any derivative image (e.g., an intermediate image, a viewable image) that is based on the original image. The location of the image data store may vary. For example, the image data store may be located within the client device (e.g., the recipient device 302 and/or the sender device 304). As another example, the image store may be located within an image processing module (e.g., the image processing module 102 of FIG. 1) that is located within the sender device 304 or within the server 306. The image data store also may be located remotely from an image processing module (e.g., the image processing module 102 of FIG. 1) that is located within the sender device 304 or within the server 306.

In various embodiments, the sender device 304 captures and provides images in a format (e.g., the compression rate, the size, the image quality, etc.) that is compatible with or optimized for the recipient device 302. For instance, constraints such as limited computing capabilities, constrained bandwidth, network limit, data limits or costs, or a recipient's preference may impact the performance of the recipient device. Low performance recipient devices may not have the processing power to resize images (e.g., shrink) for display on the mobile phone. In addition, these recipient devices may not have the processing power to download large amounts of data associated with high quality images or multiple images within an acceptable amount of time. Moreover, these recipient devices may not have the computing capabilities to process image data compressed in a bit rate, to decode a data stream, or to process a sender's instructions. Longer download and/or processing time as well as lack of processing capabilities may also adversely impact the speed and operation of the client application in general on the recipient device, resulting in unsatisfactory user experience.

Device information about a recipient device may be provided to a sender device. The device information may be further provided to a server. For example, as illustrated, the device information 310 regarding the recipient device 302 may be provided to the sender device 304 via the network 308. The device information may include information about the device that may affect the capture and provision of images from a sender to a recipient. For example, the computing capabilities, the operating system, the network carrier, the bandwidth, or other information that may affect the format of an image may be provided from the recipient to the sender. The amount of data required to capture and transmit an image to a recipient device may depend on various factors, such as the image quality at which the image is to be compressed, the size of the image, etc. Compression at higher image qualities may require more data to adequately represent the image than compression at lower image qualities. Furthermore, compression of larger sizes of an image may require more data than compression of smaller sizes. An image processing module (e.g., the image processing module 102 of FIG. 1) may communicate the device information 310 to a sender device 304.

Based on the device information 310 provided by the recipient device 302, the sender device 304 may generate image data 312 that may be provided to and processed by the recipient device 302. The image data 312 is generated such that it is compatible with or optimized for the recipient device 302. For example, based on the device information 310, the sender device 304 may determine that the recipient device 302 may support multiple image formats and accordingly may select a supported image format to generate the image data 312. The image format may be selected to provide the best user experience to the recipient. The image format may be selected such that the best image quality, the fastest image delivery speed, the lowest cost, or other user's preference is provided to the recipient. For example, based on the device information 310, the sender device 304 may determine that the recipient device 302 only supports one image format and thereby generate the image data 312 based on that image format.

In various embodiments, the image data 312 is provided to the recipient device 302 in real time or near real time as the image data 312 is being generated by the sender device 304. In the illustrated example, the image data 312 is provided from the sender device 304 to the recipient device 302 via the network 308. In further embodiments, the image data 312 may be provided to the server 306.

Based on the device information 310 provided by the recipient device 302, the sender device 304 may determine that the recipient device 302 is unable to process an image or it is more efficient that the image is processed by the sender device 304. In such an event, the original image may be processed by the sender device 304 instead of the recipient device 302 to create a derivative image. The image data 312 is generated based on the derivative image of the original image. The image data 312 may be provided to the recipient device 302 for display to the recipient.

FIG. 3B illustrates an example system 300b for recipient-side image processing as shown in FIG. 1 (e.g., the image processing module 102), according to an embodiment of the present disclosure. The illustrated system 300b includes the recipient device 302, the sender device 304, the server 306, and the network 308. The server 306 may be remote from the recipient device 302 and the sender device 304. The server 306 may be communicatively coupled to a client device (e.g., the recipient device 302 or the sender device 304) via network 308, such as the Internet. Each of recipient device 302, the sender device 304, and the server 306 may be coupled to network 308 via a wired or wireless connection.

A client application may be run on the client device (e.g., the recipient device 302 or the sender device 304) and displayed on display to a user of the client application. The client application may be a standalone application, such as a mobile application for instance. In other embodiments, the client application may be run on the server 306 and communicated to a client device for presentation on the client device. For example, the client application may include a website having one or more web pages accessible by the user through a web browser.

In some embodiments, a data store (e.g., the data store 108 of FIG. 1 or the data store 210 of FIG. 2) may store the original image, image data, as well as any derivative image based on the original image. The location of the image data store may vary. For example, the image data store may be located within the client device (e.g., the recipient device 302 and/or the sender device 304). As another example, the image store may be located within an image processing module (e.g., the image processing module 102 of FIG. 1) that locates within the sender device 304 or within the server 306. The image data store also may be located remotely from an image processing module (e.g., the image processing module 102 of FIG. 1) that locates within the sender device 304 or within the server 306.

In various embodiments, the sender device 304 captures and provides images in a format (e.g., the compression rate, the size, the image quality, etc.) that is compatible with or optimized for the recipient device 302. Devices information 314 includes both the device information 312 about the sender device 304 as well as the device information 310 about the recipient device 302. As illustrated, the devices information 314 may be provided to the server 306 via the network 308. The devices information may include information about the recipient device 302 and the sender device 304 that may affect the capture and provision of images from a sender to a recipient. For example, the computing capabilities, the operating system, the network carrier, the bandwidth, or other information that may affect the format of an image may be provided from the sender and the recipient to the server. The amount of data required to capture and transmit an image to a recipient device may depend on various factors, such as the image quality at which the image is to be compressed, the size of the image, etc. Compression at higher image qualities may require more data to adequately represent the image than compression at lower image qualities. Furthermore, compression of larger sizes of an image may require more data than compression of smaller sizes.

Based on the devices information 314 of the recipient device 302 and the sender device 304, the server 306 may determine the image format 316 that is compatible with or optimized for the recipient device 302 and that is supported by the sender device 304. For example, based on the devices information 314, the server 306 may determine that the sender device 304 and the recipient device 302 may support multiple image formats and selects a supported image format from the multiple image formats. The image format may be selected to provide the best user experience to the recipient. The image format may be selected such that the best image quality, the fastest image delivery speed, the lowest cost, or other user's preference is provided to the recipient. For example, based on the devices information 314, the sender device 304 may determine that the recipient device 302 and the sender device 304 only support one image format. The server 306 may provide the determination of the image format 316 to the sender device 304. In some embodiments, the server may provide identification of a codec compatible with the image format 316 and prompt the sender device 304 to generate the image data 312 based on that image format.

According to the determination of the image format 316, the sender device 304 may generate the image data 318. In some embodiments, the image data 318 may be generated by using the codec identified by the server 306. The image data 318 may be provided to the recipient device 302. In various embodiments, the image data 318 is provided to the recipient device 302 in real time or near real time as it is being generated by the sender device 304. In the illustrated example, the image data 312 is provided from the sender device 304 to the recipient device 302 via the network 308. In further embodiments, the image data 318 may be provided to the server 306.

Based on the devices information 314 provided by the recipient device 302 and the sender device 304, the server 306 may determine that the recipient device 302 is unable to process an image or it is more efficient that the image is processed by the sender device 304. In such an event, the original image is processed by the sender device 304 to create a derivative image. The image data 318 is generated based on the derivative image of the original image. The image data 318 may be provided to the recipient device 302 for display to the recipient.

Figure 4:
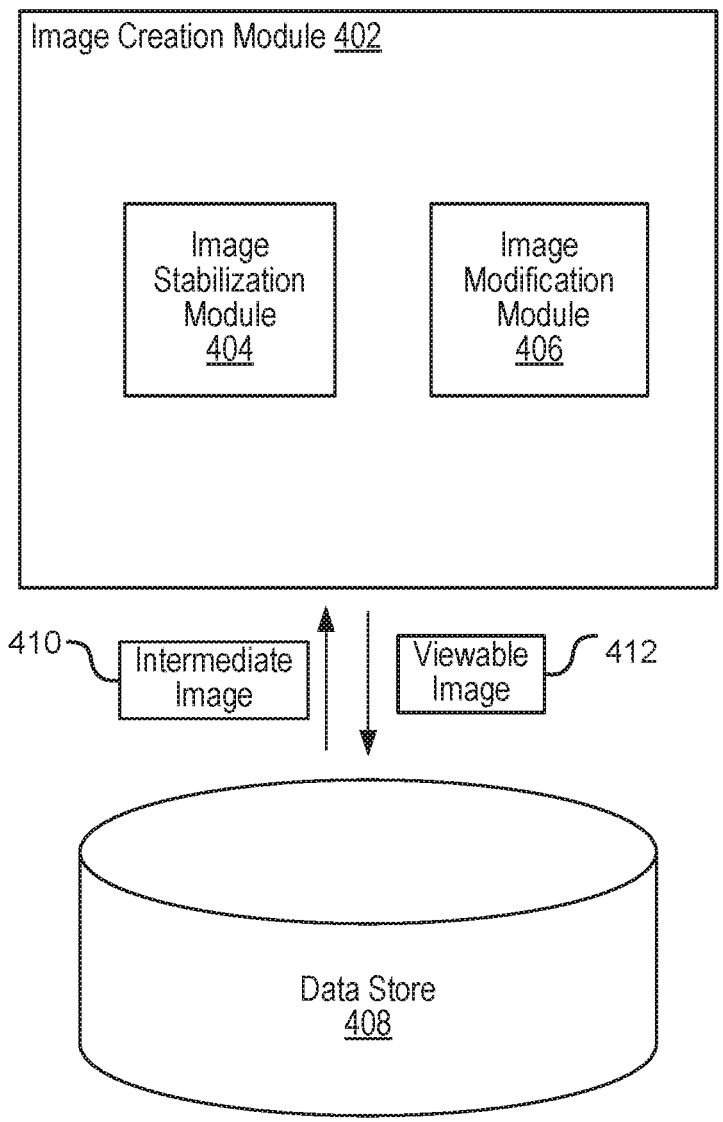
FIG. 4 illustrates an example image creation module, according to an embodiment of the present disclosure.

FIG. 4 illustrates an example image creation module 402, as shown in FIG. 1 (e.g., the image creation module 106), according to an embodiment of the present disclosure. The example image creation module 402 may create a viewable image for display to a recipient. The image creation module 402 may be configured to create the viewable image according to a sender's instructions. In some embodiments, the intermediate image may be processed according to complementary or alternative instructions of an intermediary (e.g., server) or recipient (e.g., client device). The image creation module 402 may also be configured to create the viewable image automatically. Viewable images may be created based on intermediate images. An intermediate image 410 may be obtained or received from at least one data store 408 (e.g., the data store 108 in FIG. 1). A viewable image 412 may be created based on the intermediate image 410 and may be stored in the data store 408. In various embodiments, the image creation module 402 is configured to create a viewable image in real time or near real time as a set of intermediate images is being generated from image data, for example, by an image data conversion module (e.g., the image data conversion module 104 illustrated in FIG. 1.)

The image creation module 402 may include an image stabilization module 404 and an image modification module 406. The image stabilization module 404 may be configured to reduce blurring associated with the original image. Accordingly, the blurring associated with a viewable image is less than the blurring associated with the original image captured by a sender. In some embodiments, the image stabilization module 404 may be configured to create a viewable image with less blur automatically. For example, automatic image stabilization may be performed when an original image captured by a sender is blurry and image data of the original blurry image is provided to a recipient, but the sender does not specify that the original blurry image needs to be stabilized. When a set of intermediate images is generated from the image data, the image creation module 402 is configured to create a viewable image based on the set of intermediate images such that the viewable image has less blur than the original blurry image. In some embodiments, the image stabilization module 404 may be configured to create a viewable image with less blur based on the recipient's device setting. In some embodiments, a recipient may provide that image stabilization is only performed when the blur in the original image exceeds a predetermined amount.

The image modification module 406 is configured to create a viewable image such that the viewable image is modified based on the original image according to a sender's instructions. A sender may desire to share with a recipient an image that is different from the original image as captured. For example, the original image may be cropped, zoomed, modified to a different color format, faded, tinted, or accompanied with the sender's comments, annotations, or special effects. An intermediate image may be generated from image data based on the original image without regard to any instruction to modify the image. Any modification desired and selected by a sender may be performed by the image modification module 406 on the intermediate image 410. In some embodiments, the image modification module 406 may be configured to create a viewable image including the sender's comments, annotations, or other special effects. In some embodiments, the image modification module 406 may be configured to create the viewable image 412 such that at least one parameter of the viewable image 412 is modified. For example, a sender may choose to share the original image with the application of a particular photographic filter or effect.

Figure 5:
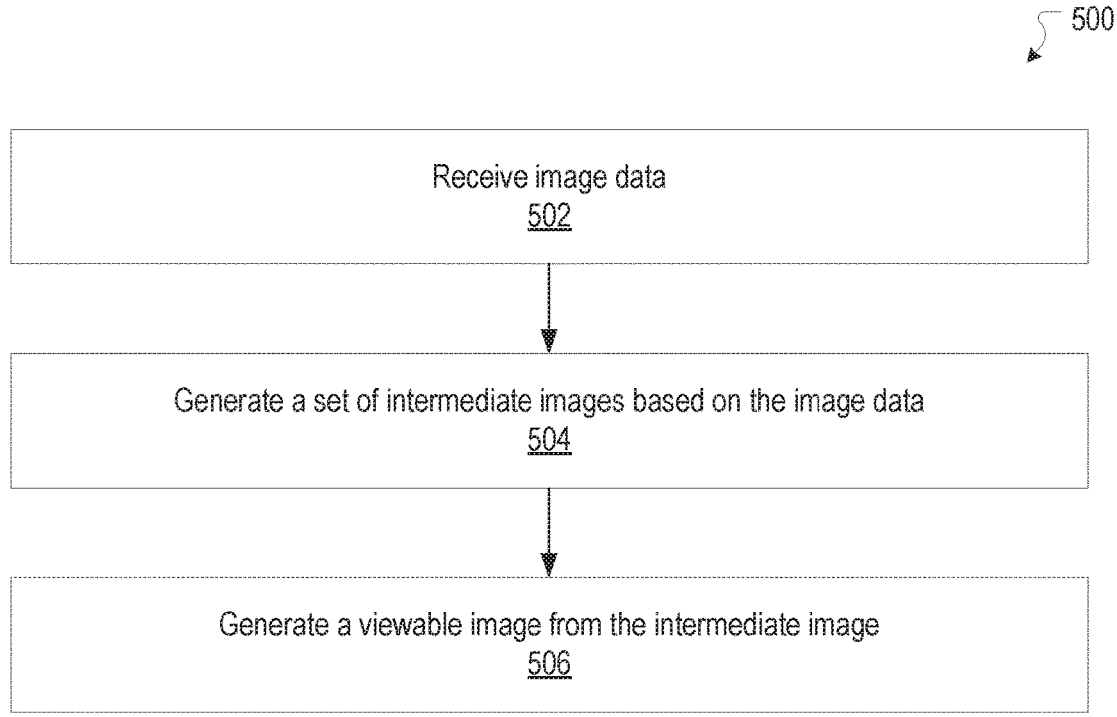
FIG. 5 illustrates an example method of processing images on the recipient side, according to an embodiment of the present disclosure.

FIG. 5 illustrates an example method 500 of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 502, image data is received by a client device used by a recipient. The recipient may be designated by a sender. Image data may be generated and received by the recipient in real time or near real time as the image is being captured. In some embodiments, the image data is received from a client device used by the sender. In some embodiments, the image data is received from a server which receives the image data from the sender. In various embodiments, the image data is generated in a format that is compatible with or optimized for the recipient's client device. At block 504, a set of intermediate images is generated based on the image data. The intermediate images may be generated in real time or near real time as the image data is being received. At block 506, a viewable image is generated from the set of intermediate images. The viewable image is for display to the recipient. The viewable image may be processed such that the original image is modified according to the sender's instructions. The viewable image may be processed automatically such that the original image is stabilized. The viewable image may be processed in real time or near real time as the set of intermediate images is being generated. More detailed discussion and examples are provided herein.

Figure 6A:
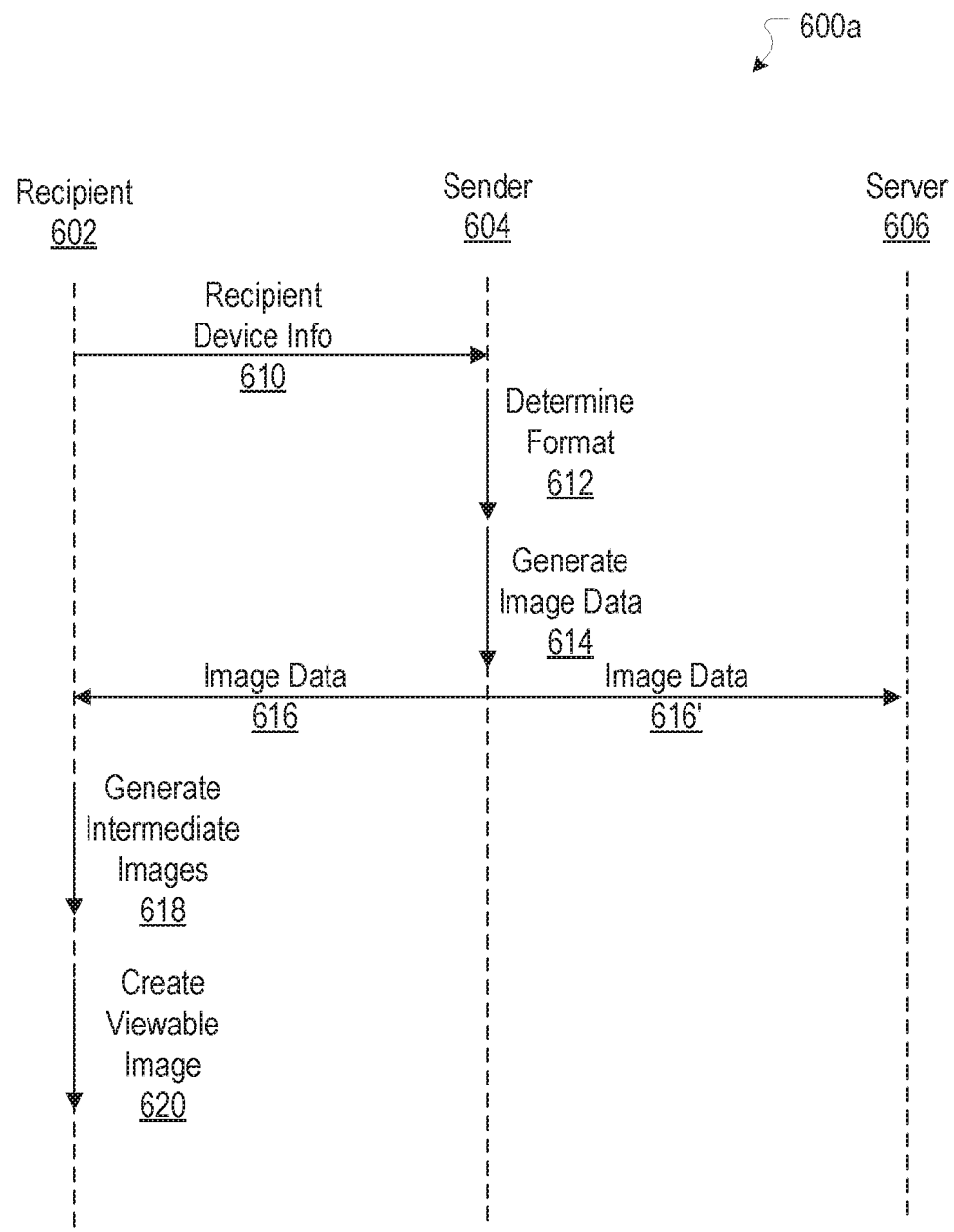
FIG. 6A illustrates an example method of processing images on the recipient side, according to an embodiment of the present disclosure.

FIG. 6A illustrates an example method 600a of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 610, device information of the recipient device is provided from a recipient device 602 to a sender device 604. In further embodiments, the device information may be provided from the recipient device 602 to a server device 606. The sender device 604 may receive the recipient device information from the recipient device 602 or from the server 606. At block 612, a format (e.g., the compression rate, the size, the image quality, etc.) is determined, based on the recipient device information, by the sender device 604. The format may be compatible with or optimized for the recipient device. At block 614, image data is generated, by the sender device, based on the format determined at block 612. The image data is provided to and received by the recipient device 602, at block 616. Additionally or alternatively, the image data is provided to and received by the server 606, at block 616'. At block 618, a set of intermediate images is generated, by the recipient device 602, from the image data received at block 616. At block 620, a viewable image is created from the intermediate images, by the recipient device 602. More detailed discussion and examples are provided herein.

Figure 6B:
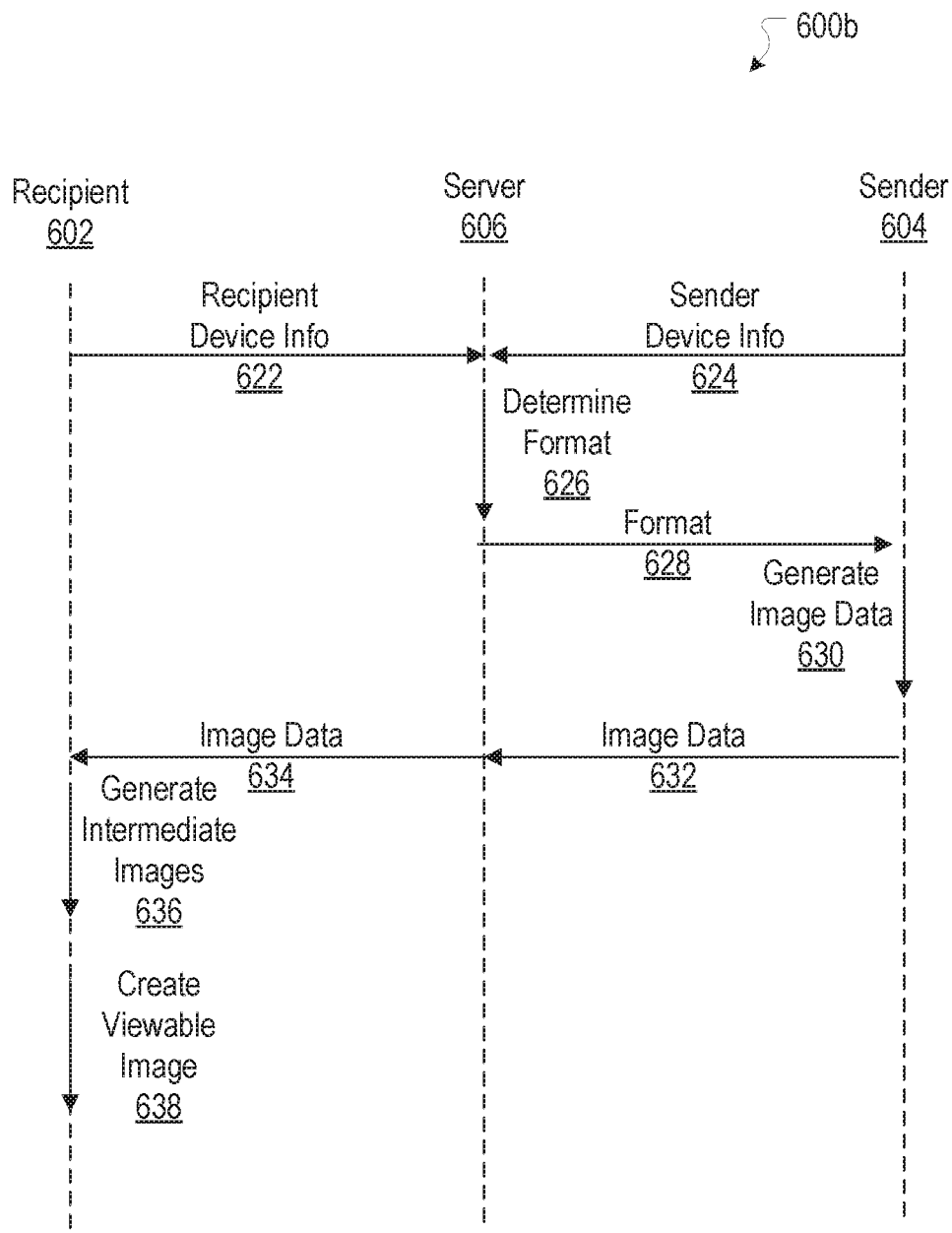
FIG. 6B illustrates an example method of processing images on the recipient side, according to an embodiment of the present disclosure.

FIG. 6B illustrates an example method 600b of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 622, device information of the recipient device 602 is provided from the recipient device 602 to the server 606. At block 624, device information of the sender device 604 is provided from the sender device 604 to the server 606. At block 626, a format (e.g., the compression rate, the size, the image quality, etc.) is determined, based on the recipient device information, by the server 606. At block 628, the format may be communicated or provided to the sender 604. In some embodiments, the identification of a codec compatible with or optimized for the format may be provided by the server 606 to the sender 604. At block 630, image data is generated, by the sender device 604, based on the format determined at block 626. The sender device 604 may generate the image data using the codec identified by the server 606. The image data is provided to and received by the server 606, at block 632. In some embodiments, the image data is provided by the sender device 604 directly to the recipient device 602. The image data is provided to and received by the recipient device 602, at block 634. At block 636, a set of intermediate images is generated, by the recipient device 602, from the image data received at block 634. At block 636, a viewable image is created from the intermediate images, by the recipient device 602. More detailed discussion and examples are provided herein.

Figure 6C:
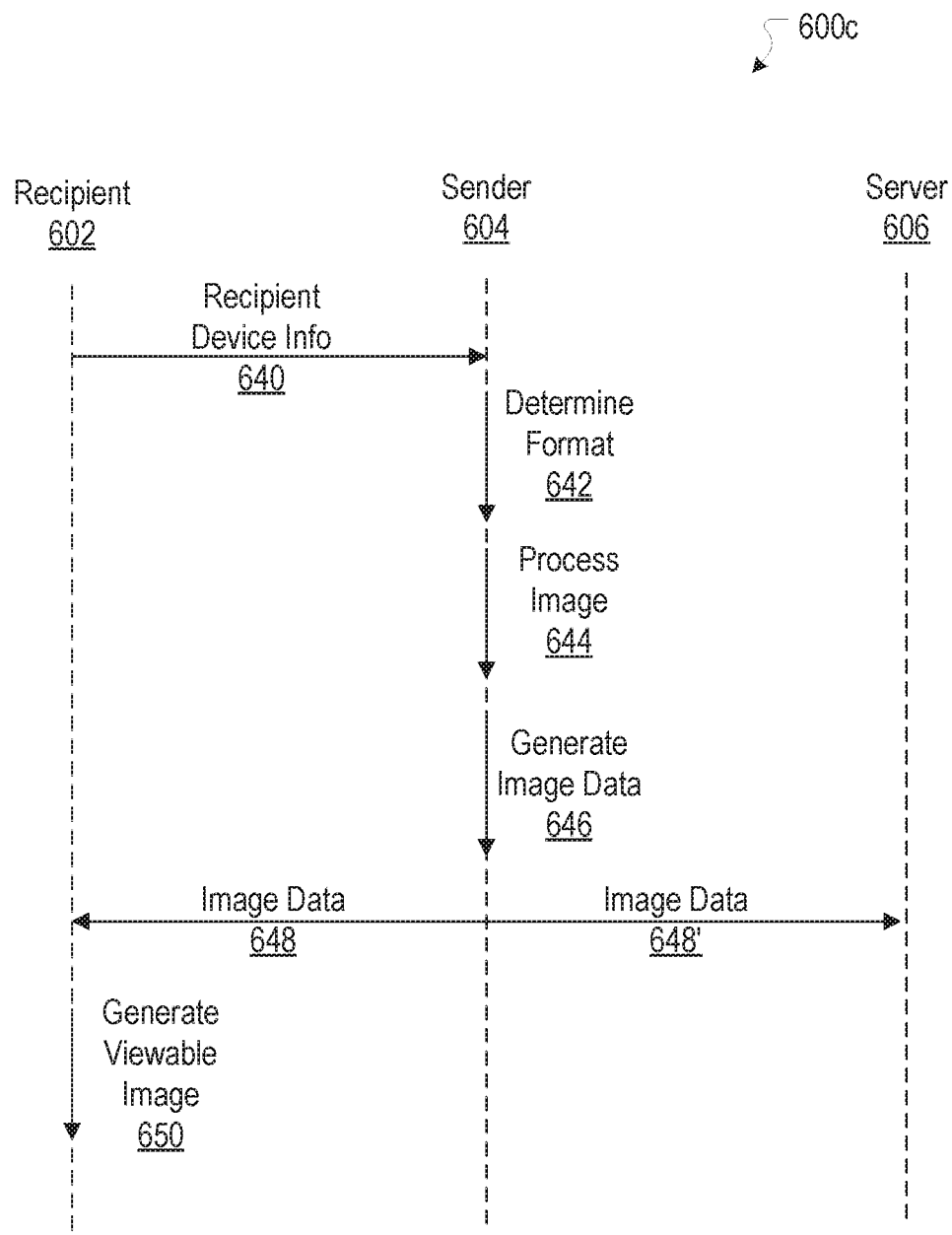
FIG. 6C illustrates an example method of processing images on the recipient side, according to an embodiment of the present disclosure.

FIG. 6C illustrates an example method 600c of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 640, device information of the recipient device 602 is provided from the recipient device 602 to the sender 604. At block 642, a format (e.g., the compression rate, the size, the image quality, etc.) is determined, based on the recipient device information, by the sender 604. The format may be compatible with or optimized for the recipient device 602. The sender device 604 may determine that it is more efficient for the sender device 604 to modify the original image or the recipient device 602 may lack the capability to process the original image. At block 644, the original image captured by the sender device 604 is processed by the sender device 604. The sender device 604 may stabilize the original image or modify the original image according to the sender's instructions. At block 646, image data is generated from the processed image, by the sender device 604, based on the format identified at block 642. The image data is provided to and received by the recipient device 602, at block 648. Additionally or alternatively, the image data is provided to and received by the server 606, at block 648'. At block 650, a viewable image for display on the recipient device 602 is generated, by the recipient device 602, based on the image data received at block 648. More detailed discussion and examples are provided herein.

Figure 6D:
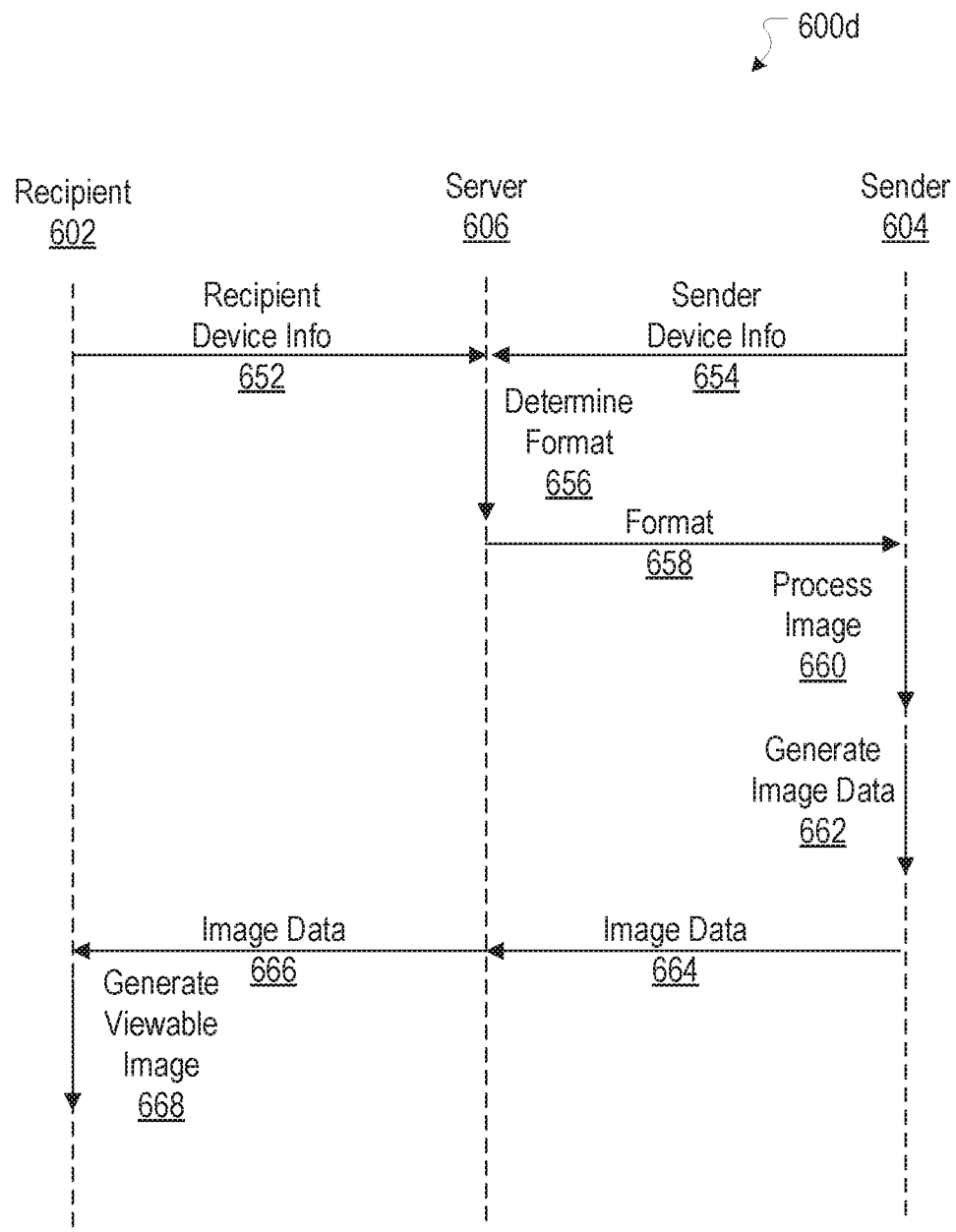
FIG. 6D illustrates an example method of processing images on the recipient side, according to an embodiment of the present disclosure.

FIG. 6D illustrates an example method 600d of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 652, device information of the recipient device 602 is provided from the recipient device 602 to the server 606. At block 654, device information of the sender device 604 is provided from the sender device 604 to the server 606. At block 656, a format (e.g., the compression rate, the size, the image quality, etc.) is determined, based on the recipient device information and the sender device information, by the server 606. The format may be compatible with or optimized for the recipient device 602. At step 658, the format may be communicated or provided to the sender 604. In some embodiments, identification of a codec compatible with or optimized for the format may be provided by the server 606 to the sender 604. The server 606 may determine that it is more efficient for the sender device 604 to modify the original image or the recipient device 602 may lack the capability to process the original image. At block 660, the original image captured by the sender device 604 is processed by the sender device 604. The sender device 604 may stabilize the original image or modify the original image according to the sender's instructions. At block 662, image data is generated from the processed image, by the sender device 604, based on the format identified at block 656. The image data is provided to and received by the server 606, at block 664. The image data is provided to and received by the recipient device 602, at block 666. At block 668, a viewable image for display on the recipient device 602 is generated, by the recipient device 602, based on the image data received at block 666. More detailed discussion and examples are provided herein.

Figure 6E:
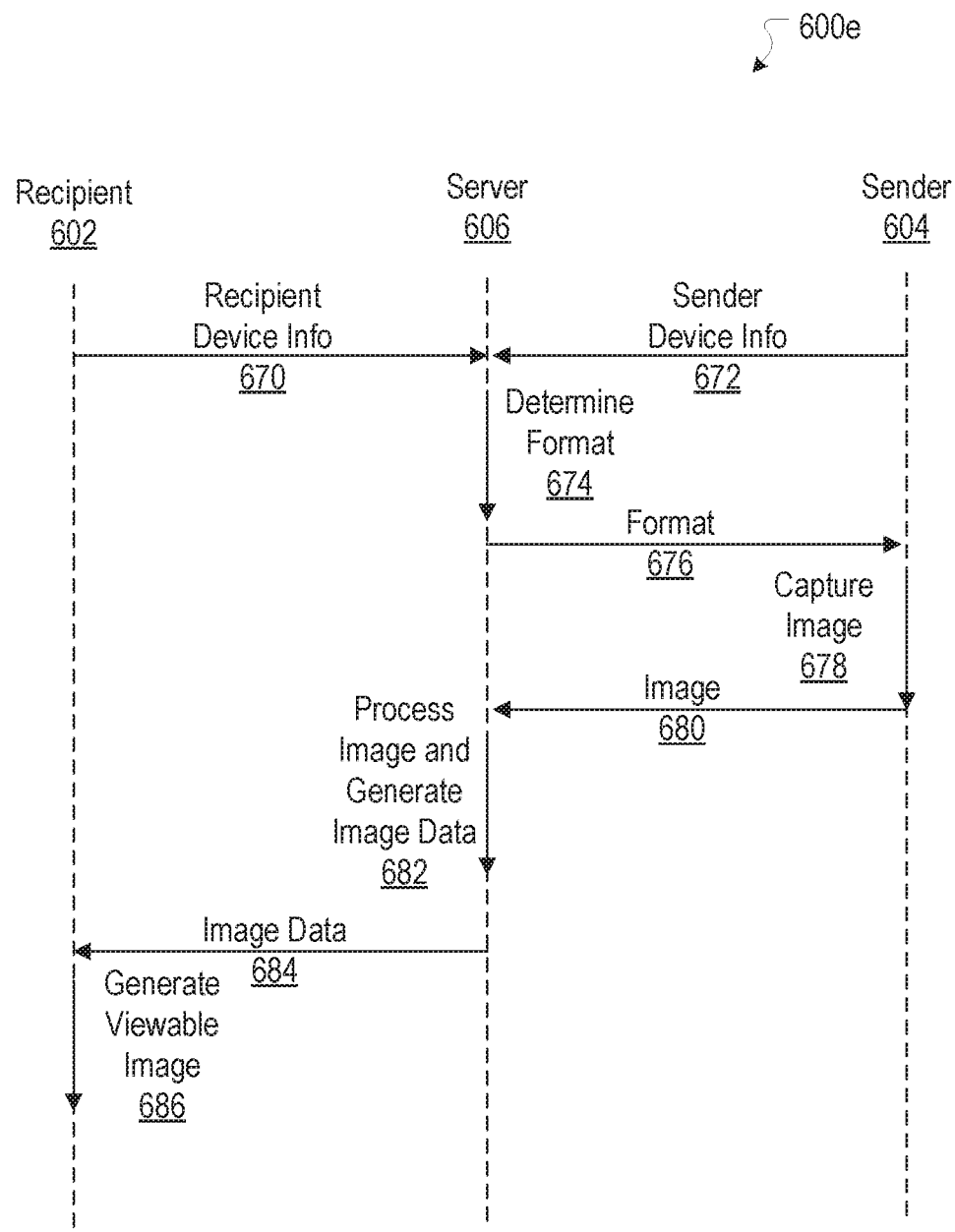
FIG. 6E illustrates an example method of processing images on the recipient side, according to an embodiment of the present disclosure.

FIG. 6E illustrates an example method 600e of processing images on the recipient side, according to an embodiment of the present disclosure. It should be appreciated that there can be additional, fewer, or alternative steps performed in similar or alternative orders, or in parallel, within the scope of the various embodiments unless otherwise stated. At block 670, device information of the recipient device 602 is provided from the recipient device 602 to the server 606. At block 672, device information of the sender device 604 is provided from the sender device 604 to the server 606. At block 674, a format (e.g., the compression rate, the size, the image quality, etc.) is determined, based on the recipient device information and the sender device information, by the server 606. The format may be compatible with or optimized for the recipient device 602. At step 676, the format may be communicated or provided to the sender 604. In some embodiments, identification of a codec compatible with or optimized for the format may be provided by the server 606 to the sender 604. The server 606 may determine that it is more efficient for the server 606 to modify the original image or the sender device 604 and/or the recipient device 602 may lack the capability to process the original image. At block 678, the image is captured by the sender device 604 according to the format identified at block 674. At block 680, the captured image is provided by the sender 604 to the server 606. The captured image may be compressed and/or encrypted before being provided to the server 606. At block 682, the original image captured by the sender device 604 is processed by the server 606 and image data is generated according to the format identified at block 674. The server 606 may stabilize the original image or modify the original image according to the sender's instructions. The image data is provided to and received by the recipient device 602, at block 684. At block 686, a viewable image for display on the recipient device 602 is generated, by the recipient device 602, from the image data received at block 684. More detailed discussion and examples are provided herein.

Social Networking System—Example Implementation

Figure 7:
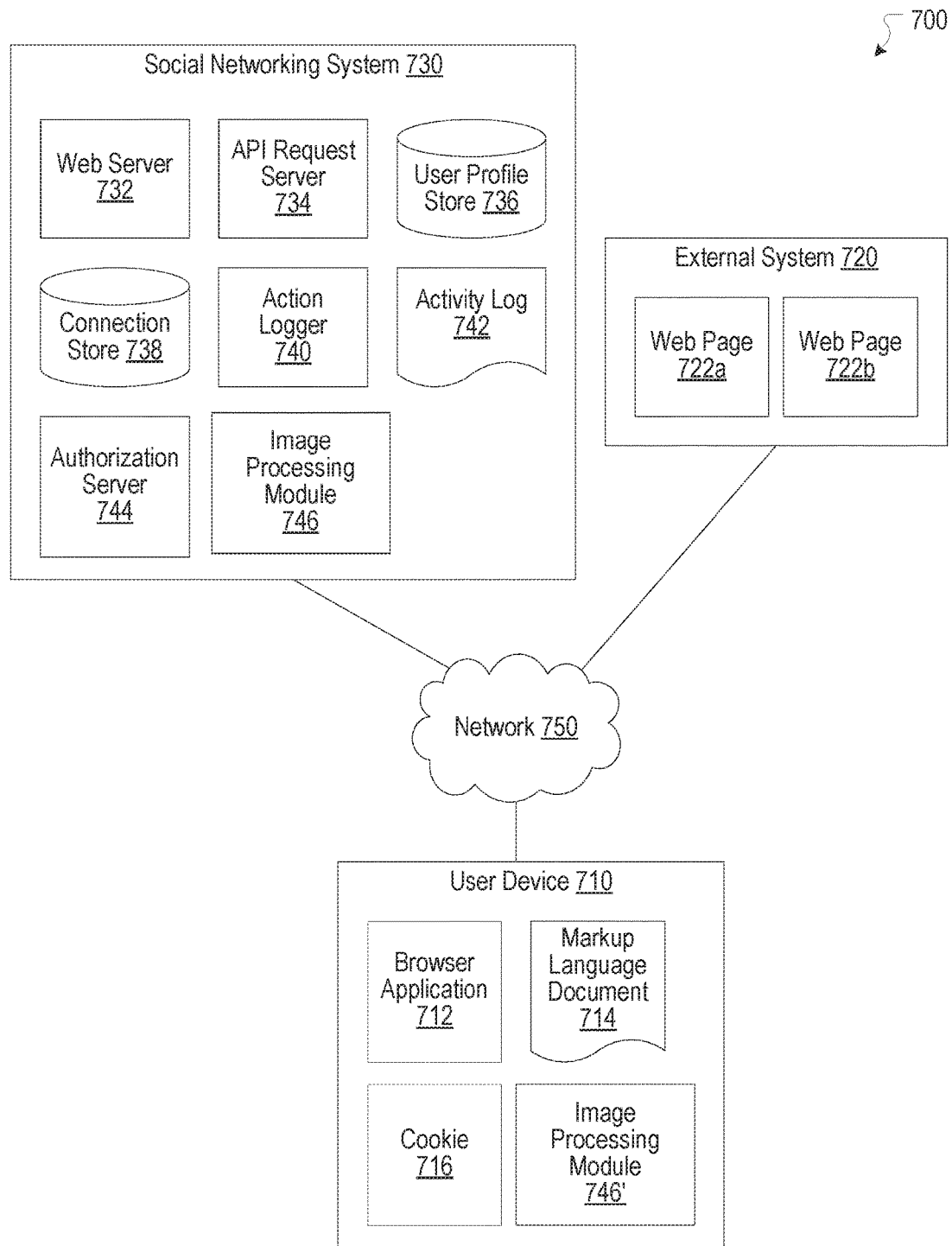
FIG. 7 illustrates a network diagram of an example system that can be utilized in various scenarios, according to an embodiment of the present disclosure.

FIG. 7 illustrates a network diagram of an example system 700 that can be utilized in various embodiments for enhanced video encoding, in accordance with an embodiment of the present disclosure. The system 700 includes one or more user devices 710, one or more external systems 720, a social networking system 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722*a*, 722*b*, which are communicated to the user device 710 using the network 750. The external system 720 is separate from the social networking system 730. For example, the external system 720 is associated with a first domain, while the social networking system 730 is associated with a separate social networking domain. Web pages 722*a*, 722*b*, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

The social networking system 730 can include an image processing module 746. In some embodiments, the image processing module 746 can be implemented as the image processing module 102 of FIG. 1. The image processing module 746 can be configured to create, process, and/or modify images, according to various embodiments of the present disclosure.

The user device 710 can include an image processing module 746'. In some embodiments, the image processing module 746' can be implemented as the image processing module 102 of FIG. 1. The image processing module 746' can be configured to create, process, and/or modify images, according to various embodiments of the present disclosure.

Hardware Implementation

Figure 8:
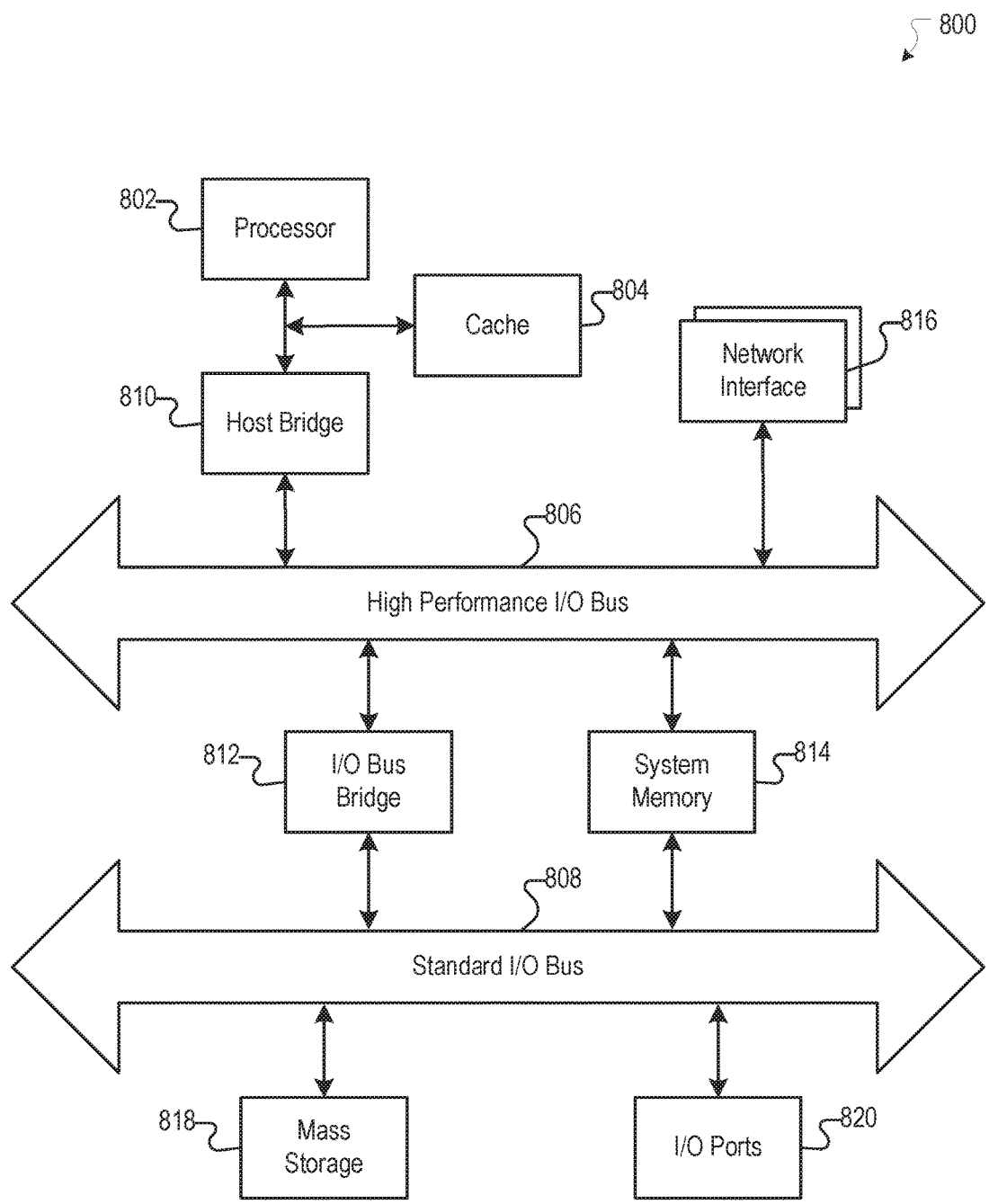
FIG. 8 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 720, or a component thereof. In an embodiment of the invention, the computer system 800 may be one server among many that constitutes all or part of the social networking system 830.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   receiving, by a first computing system, recipient image data associated with an original image captured by a second computing system;
   generating, by the first computing system, a first intermediate image based on the recipient image data, the generating the first intermediate image comprising decoding the recipient image data based on a format that is determined by a third computing system, wherein the format is determined based on at least one of device information related to the first computing system or device information related to the second computing system; and
   generating, by the first computing system, a first viewable image for display on the first computing system based on the first intermediate image.

2. The computer-implemented method of claim 1, further comprising displaying, by the first computing system, the first viewable image.

3. The computer-implemented method of claim 1, wherein the first computing system is a client device.

4. The computer-implemented method of claim 1, wherein the second computing system is a client device.

5. The computer-implemented method of claim 1, wherein the at least one of device information related to the first computing system and device information related to the second computing device is received by the third computing system.

6. The computer-implemented method of claim 5, wherein the third computing system is a server.

7. The computer-implemented method of claim 1, wherein the generating the first viewable image based on the first intermediate image comprises applying an image filter to the first intermediate image.

8. The computer-implemented method of claim 1, wherein blur associated with the first viewable image is less than blur associated with the original image.

9. The computer-implemented method of claim 1, wherein the first intermediate image has a first resolution and the first viewable image has a second resolution.

10. The computer-implemented method of claim 1, wherein the first intermediate image has a first color format and the first viewable image has a second color format.

11. A system comprising:
    at least one processor; and
    a memory storing instructions that, when executed by the at least one processor, cause the system to perform:
    receiving, by a first computing system, recipient image data associated with an original image captured by a second computing system;
    generating a first intermediate image based on the recipient image data, the generating the first intermediate image comprising decoding the recipient image data based on a format that is determined by a third computing system, wherein the format is determined based on at least one of device information related to the first computing system or device information related to the second computing system; and
    generating a first viewable image for display on the first computing system based on the first intermediate image.

12. The system of claim 11, wherein the first computing system is a client device.

13. The system of claim 11, wherein the second computing system is a client device.

14. The system of claim 11, wherein the at least one of device information related to the first computing system and device information related to the second computing device is received by the third computing system.

15. The system of claim 14, wherein the third computing system is a server.

16. A non-transitory computer-readable storage medium including instructions that, when executed by at least one processor of a computing system, cause the computing system to perform:
    receiving, by a first computing system, recipient image data associated with an original image captured by a second computing system;
    generating a first intermediate image based on the recipient image data, the generating the first intermediate image comprising decoding the recipient image data based on a format that is determined by a third computing system, wherein the format is determined based on at least one of device information related to the first computing system or device information related to the second computing system; and
    generating a first viewable image for display on the first computing system based on the first intermediate image.

17. The non-transitory computer-readable storage medium of claim 16, wherein the first computing system is a client device.

18. The non-transitory computer-readable storage medium of claim 16, wherein the second computing system is a client device.

19. The non-transitory computer-readable storage medium of claim 16, wherein the at least one of device information related to the first computing system and device information related to the second computing device is received by the third computing system.

20. The non-transitory computer-readable storage medium of claim 19, wherein the third computing system is a server.

* * * * *